United States Patent
Karp et al.

(10) Patent No.: US 11,578,682 B2
(45) Date of Patent: Feb. 14, 2023

(54) SMALLSAT HYBRID PROPULSION SYSTEM

(71) Applicant: California Institute of Technology, Pasadena, CA (US)

(72) Inventors: Ashley C. Karp, Pasadena, CA (US); Elizabeth Jens, Pasadena, CA (US); Jason Rabinovitch, Pasadena, CA (US); Barry Nakazono, Altadena, CA (US); Antonietta Conte, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 488 days.

(21) Appl. No.: 16/455,532

(22) Filed: Jun. 27, 2019

(65) Prior Publication Data

US 2020/0003159 A1    Jan. 2, 2020

Related U.S. Application Data

(60) Provisional application No. 62/692,440, filed on Jun. 29, 2018.

(51) Int. Cl.
| | | |
|---|---|---|
| *F02K 9/32* | (2006.01) | |
| *F02K 9/80* | (2006.01) | |
| *F02K 9/95* | (2006.01) | |

(52) U.S. Cl.
CPC .............. *F02K 9/32* (2013.01); *F02K 9/80* (2013.01); *F02K 9/95* (2013.01)

(58) Field of Classification Search
CPC .............. F02K 9/72; F02K 9/32; B64G 1/404
See application file for complete search history.

(56) References Cited

U.S. PATENT DOCUMENTS

| | | | | |
|---|---|---|---|---|
| 7,404,288 | B2* | 7/2008 | Sarigul-Klijn | F02K 9/72 60/251 |
| 2002/0036038 | A1* | 3/2002 | Karabeyoglu | F02K 9/72 149/19.9 |
| 2003/0046922 | A1* | 3/2003 | McGrath | F42B 10/66 60/253 |
| 2008/0290191 | A1* | 11/2008 | Facciano | B29C 70/28 239/265.11 |
| 2013/0255223 | A1* | 10/2013 | Brady | F02K 9/72 60/225 |
| 2016/0032867 | A1* | 2/2016 | Mahaffy | F02K 9/34 60/211 |
| 2018/0334996 | A1* | 11/2018 | Chew | F02K 9/97 |

OTHER PUBLICATIONS

Whitmore "Consumable Spacecraft Structure with 3-D Printed Acrylonitrile Butadiene Styrene (ABS) Hybrid Rocket Thrusters" (Year: 2017).*

(Continued)

*Primary Examiner* — Arun Goyal
*Assistant Examiner* — William L Breazeal
(74) *Attorney, Agent, or Firm* — KPPB LLP

(57) ABSTRACT

A hybrid propulsion system for a small satellite package consisting of a main rocket motor containing a solid propellant with multiple oxidizer tanks positioned to direct oxidizer into the rocker motor, thereby producing a desired thrust necessary for orbit insertion and/or orbit correction. Additionally, oxidizers can serve a dual function in controlling cold fuel thrusters for attitude adjustment.

32 Claims, 12 Drawing Sheets

(56) References Cited

OTHER PUBLICATIONS

Knauber "Thrust Misalignments of Fixed-Nozzle Solid Rocket Motors" (Year: 1996).*
Willingham "Development of Miniature Hybrid Rockets for Orbital Upkeep and Transfer Applications in Nano/Pico-Satellites" (Year: 2008).*
Lewis Composite Overwrapped Pressure Vessels (COPV) (Year: 2002).*
Jens "Design of a Hybrid CubeSat Orbit Insertion Motor" (Year: 2016).*
Space Safety Magazine "Hybrid Rocket Motor Overview" (Year: 2014).*
American Institute of Aeronautics and Astronautics Specification (AIAA S-120-2006) Table 1, 2006.
"General Payload Users Guide", Spaceflight, Inc., 2015. URL http://www.spaceflight.com/wp-content/uploads/2015/05/SPUG-RevF.pdf.
"MARCO Technical Data Sheet", JPL, 2015, 2 pgs.
"Payload Specification for 3U, 6U, 12U and 27U", Planetary Systems Corporation, Aug. 4, 2017. URL http://www.planetarysystemscorp.com/web/wp-content/uploads/2017/08/2002367E-Payload-Spec-for-3U-6U-12U-27U.pdf.
"Portable Life Support System", Hamilton Standard, https:www.hq.nasa.gov/alsj/LM15_Portable_Life_Support_System_ppP1-5.pdf.
Conte et al., "Design, Modeling and Testing of a O2/CH4 Igniter for a Hybrid Rocket Motor", American Institute of Aeronautics and Astronautics, Jun. 24, 2018, 3239, doi: 10.2514/6.2018-3239.
Jens et al., "Design and Testing of a Hybrid Rocket Motor to Enable Interplanetary CubeSat Missions", 68th International Astronautical Congress, Sep. 29, 2017.
Jens et al., "Development Testing of Hybrid Rocket Motors Using Classical Fuels for Interplanetary CubeSats", 53rd AIAA/SAE/ASEE Joint Propulsion Conference, Jul. 7, 2017, 4981, 16 pgs., doi: 10.2514/6.2017-4981.
Jens et al., "Hybrid Rocket Propulsion Systems for Outer Planet Exploration Missions", Acta Astronautica, vol. 128, Nov.-Dec. 2016, pp. 119-130, doi: 10.1016/j.actaastro.2016.06.036.
Karabeyoglu et al., "Effect of "O/F Shift" on Combustion Efficiency", American Institute of Aeronautics and Astronautics, Jul. 25, 2014, 3851, 19 pgs., doi: 10.2514/6.2014-3851.
Karp et al., "A hybrid mars ascent vehicle design and FY 2016 technology development", IEEE Aerospace Conference, Mar. 4-11, 2017, 9 pgs., doi 10.1109/AERO.2017.7943948.
McBride et al., "Computer Program for Calculation of Complex Chemical Equilibrium Compositions and Applications: II. Users Manual and Program Description", National Aeronautics and Space Administration, Office of Management, Scientific and Technical Information Program, Jun. 1996, 184 pgs.
Mechentel et al., "Hybrid Propulsion In-Situ Resource Utilization Test Facility Results for Performance Characterization", American Institute of Aeronautics and Astronautics, , Jul. 22, 2016, doi: 10.2514/6.2016-4656.
Rabinovitch et al., "Characterization of PolyMethylMethAcrylate as a Fuel for Hybrid Rocket Motors", American Institute of Aeronautics and Astronautics, Jul. 8, 2018, 4530, doi: 10.2514/6.2018-4530.
Schoolcraft et al., "MarCO: Interplanetary Mission Development On a CubeSat Scale", 14th International Conference on Space Operations, May 16-20, 2016, 2491, doi: 10.2514/6.2016-2491.
Simurda et al., "Continued Testing of the High Performance Hybrid Propulsion System for Small Satellites", American Institute of Aeronautics and Astronautics, Jul. 23, 2015, 4201, 23 pgs., doi: 10.2514/6.2015-4201.
Zilliac et al., "Hybrid Rocket Fuel Regression Rate Data and Modeling", 42nd AIAA/ASME/SAE/ASEE Joint Propulsion Conference & Exhibit, Jul. 9-12, 2006, AIAA 2006-4504.
Carpenter et al., "CubeSat High-Impulse Adaptable Modular Propulsion System (CHAMPS) Product Line Development Status and Mission Applications", 49th AIAA/ASME/SAE/ASEE Joint Propulsion Conference, Jul. 12, 2013, p. 3760, doi: 10.2514/6.2013-3760.
Gibbon et al., "Cost Effective Propulsion Systems for Small Satellites Using Butane Propellant", Acta Astronautica, Jul.-Nov. 2002, vol. 51, No. 1-9, pp. 145-152, doi: 10.1016/50094-5765(02)00074-7.
Mechentel et al., "Small-scale Gaseous Oxygen Hybrid Rocket Testing for Regression Rate and Combustion Efficiency Studies", American Institute of Aeronautics and Astronautics, 2017, Published online Jul. 8, 2018, 4439, doi 10.2514/6.2018-4439.
Sutton et al., "Rocket Propulsion Elements", John Wiley & Sons, 2010, 764 pgs., (presented in three parts).

* cited by examiner

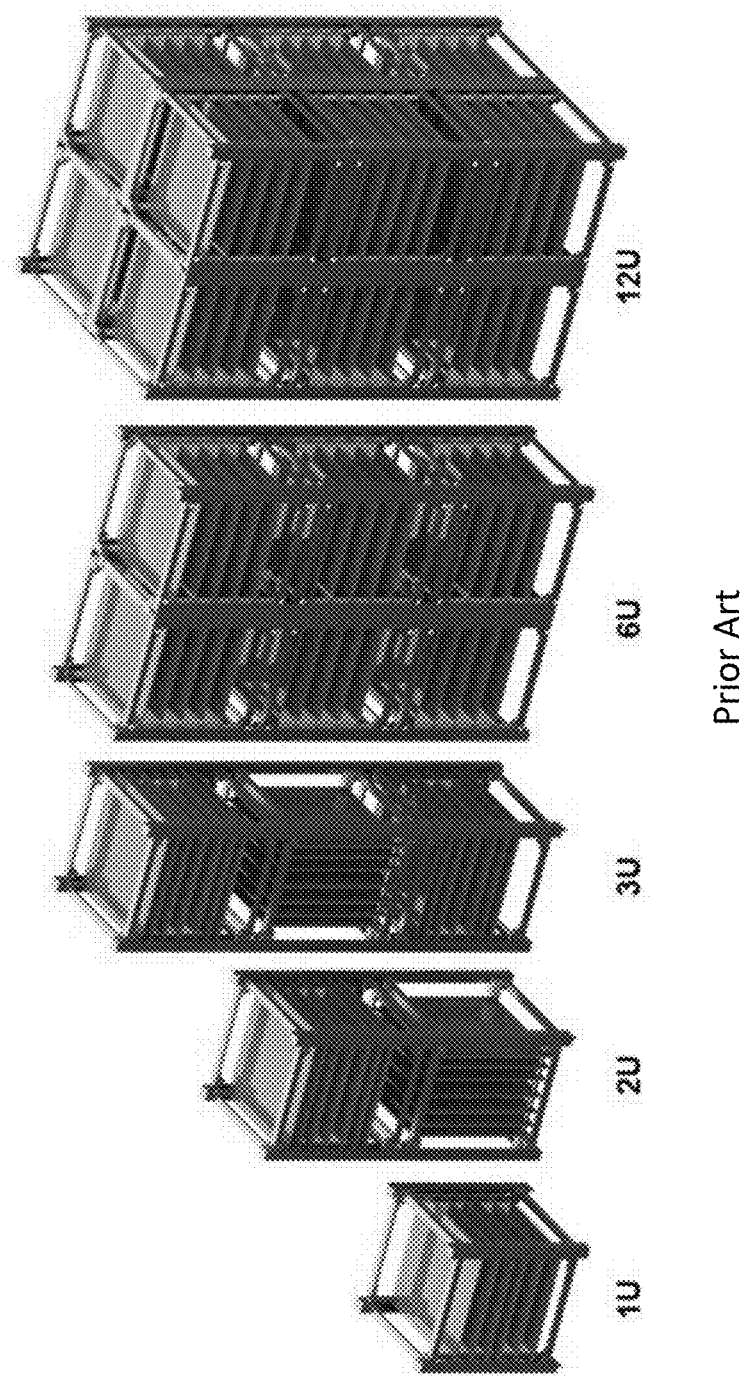
Fig. #1

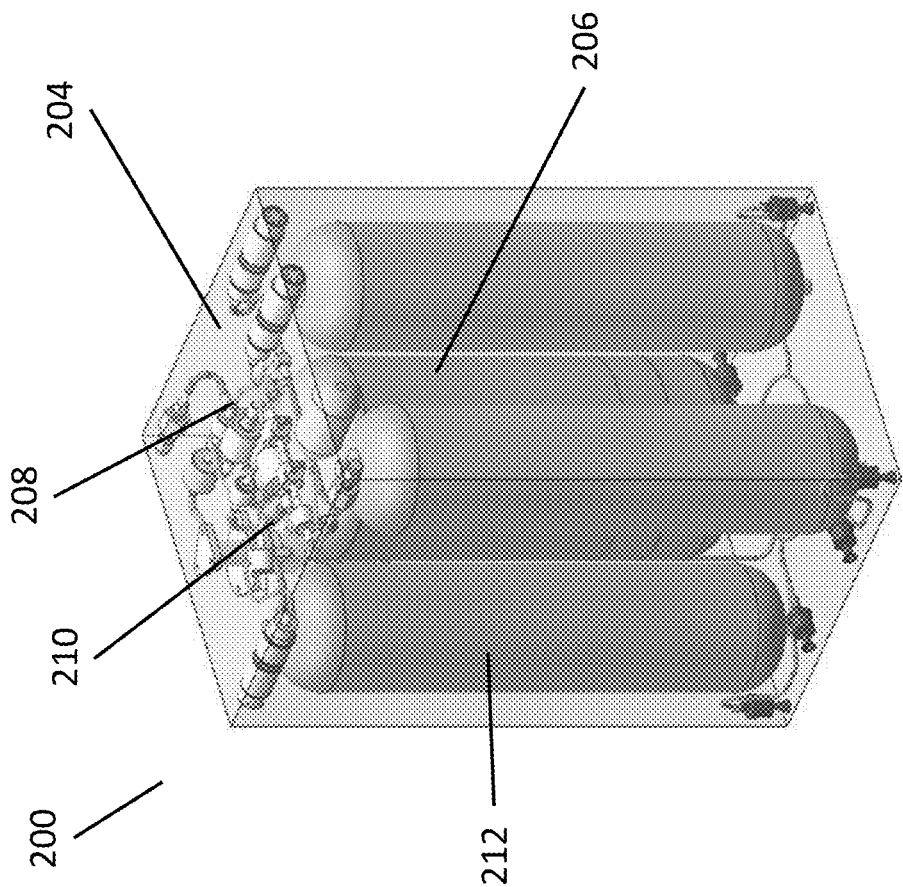
Fig. #2

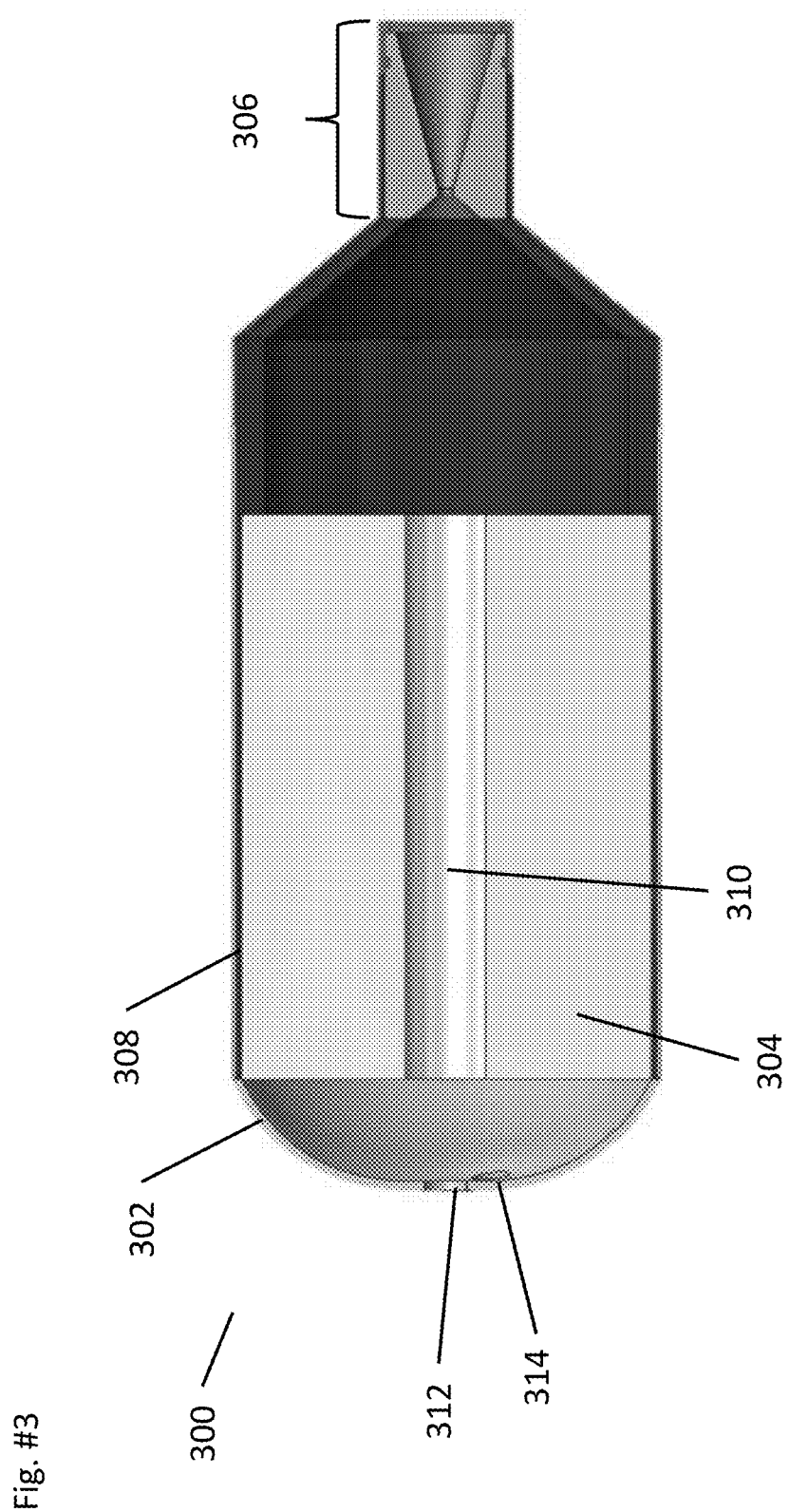
Fig. #3

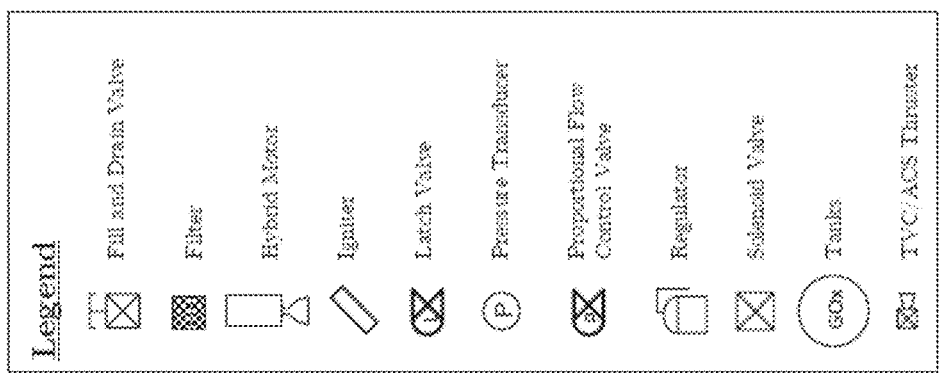
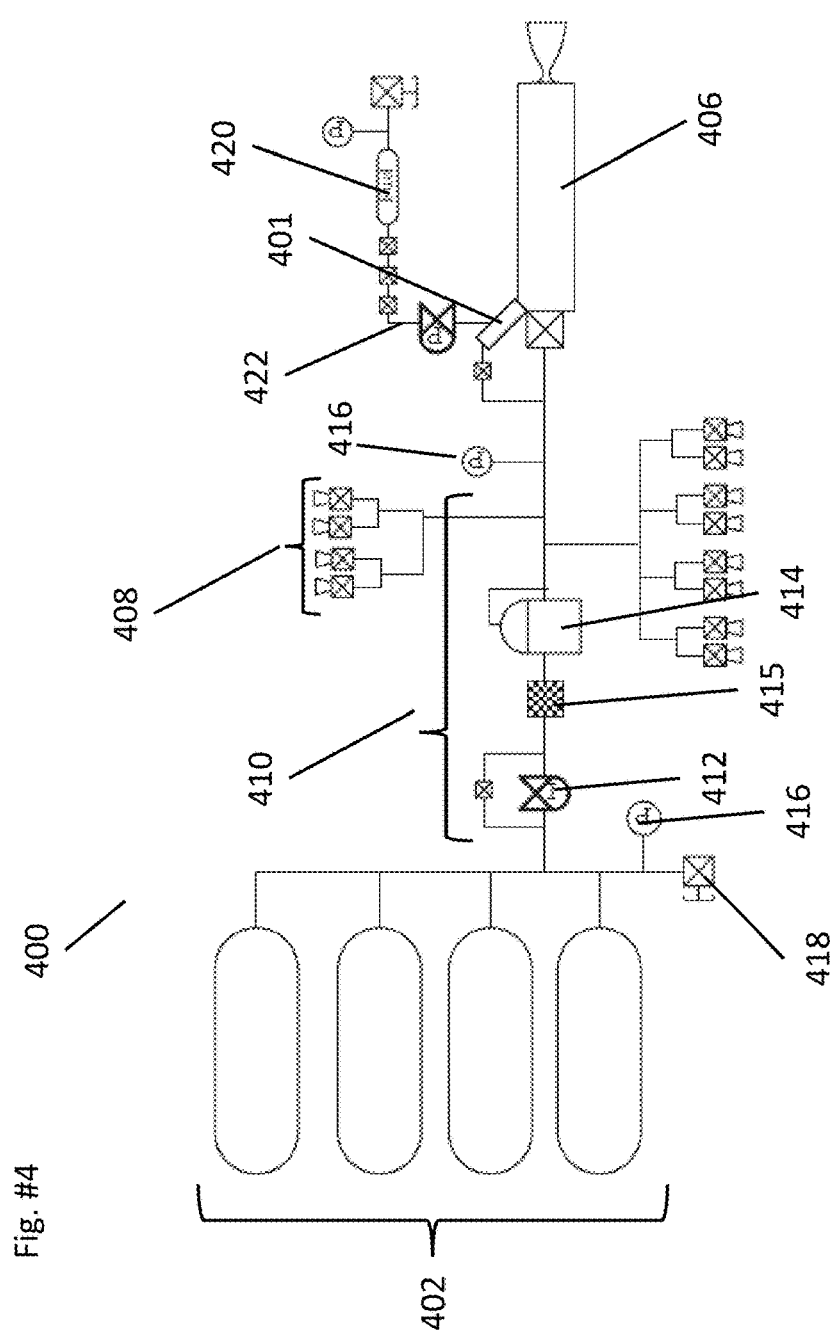
Fig. #4

| Fuel | $h_f$ | Ideal $I_{sp}$ | Ideal O/F | $t_b$ | Thrust | $L_f$ |
| [-] | [kJ/mol] | [s] | [-] | [s] | [N] | [cm] |
| PMMA | -430.8 | 334.5 | 1.60 | 396.5 | 44.4 | 17.5 |
| Clear PMMA | -459.7 | 332.9 | 1.60 | 397.0 | 44.3 | 17.5 |
| Black PMMA | -166.9 | 349.2 | 1.45 | 386.5 | 45.8 | 18.8 |

Fig. #5

|  | Hybrid (PMMA/GOx) | State of the Art Monopropellant | | |
|---|---|---|---|---|
|  |  | Hydrazine | HAN 10% water (AF-M315) | ADN (LMP-103S) |
| Available Non-Propulsion Mass/Payload |  | 16.67 | | |
| Main Advantage | High Isp/Thrust | TRL | Higher Density than hydrazine | |
| Isp (Performance) | 311 s | 227 s | 213 s | 243 s |
| Thrust [N] | 50 | 21 | 20 | 20 |
| Delta V for 12U, 25 kg | 315 | 148 | 61 | 89 |
| Prop System % Volume | 67.8% of 6U | 71.5% of 6U | 74.8% of 6U | 66.1% of 6U |
| Survival Temperature [C] (5 C margin) | −150 | 8 | −75 | −85° |
| Toxicity/Issues | Nontoxic | Toxic | Acidic, titanium components only | Similar to Ammonia, Precipitate is 1.4 explosive |
| Single Burn Impulse [Ns](e.g. 1 hr OI burn) | 5,050 | 2,520 | 4,990 | 2,640 |

Fig. #6

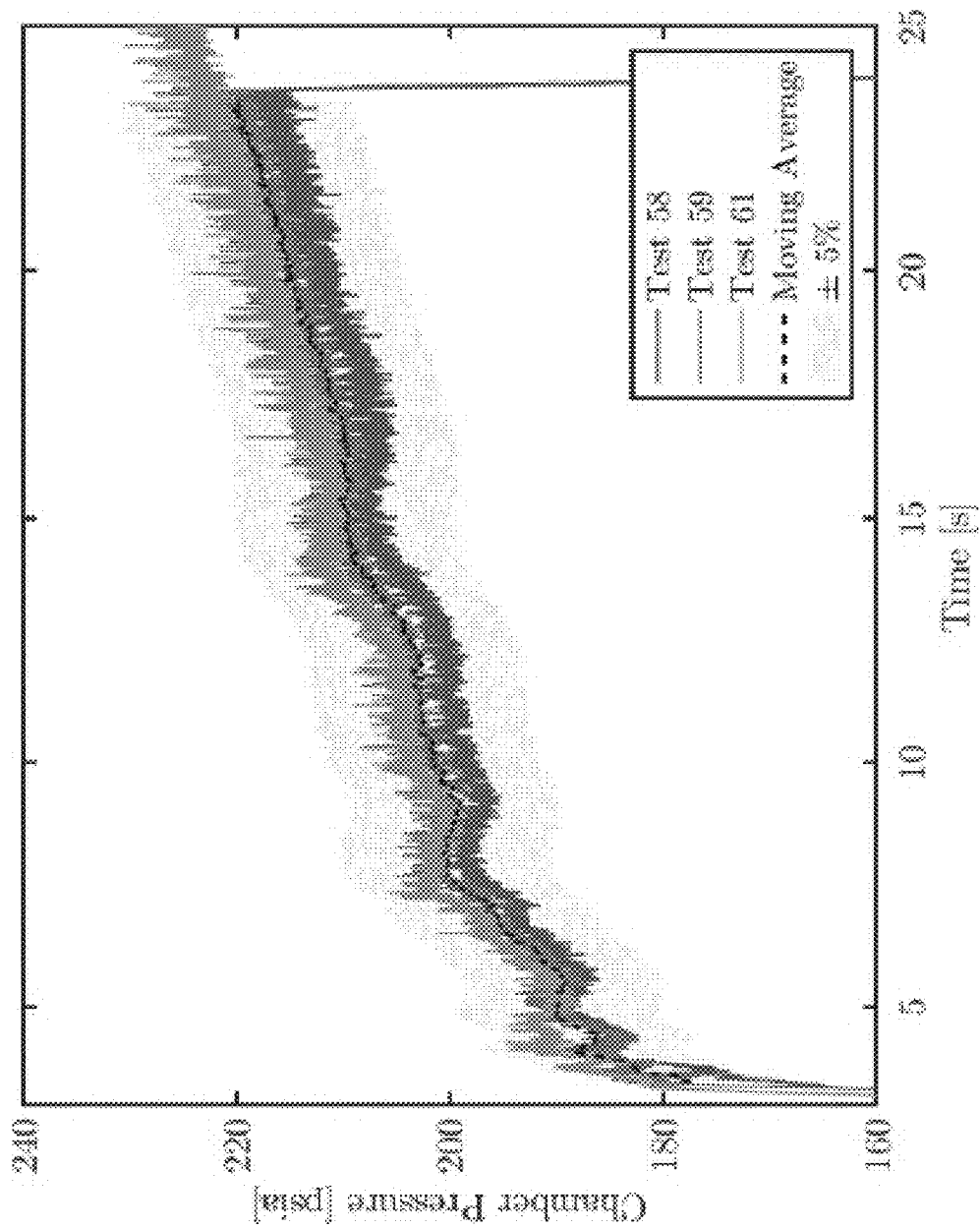
Fig. #7

Fig. #8b
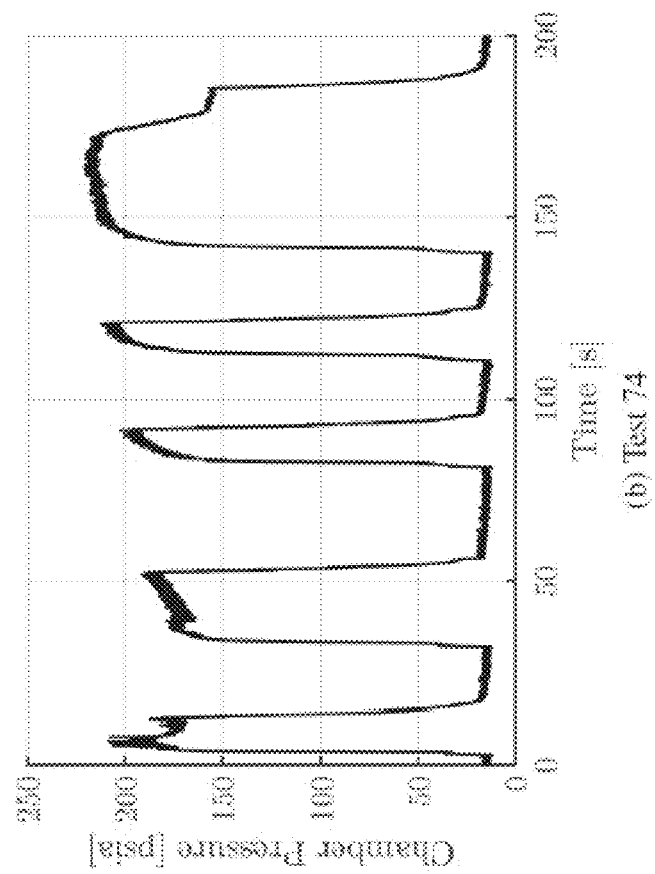
Fig. #8a
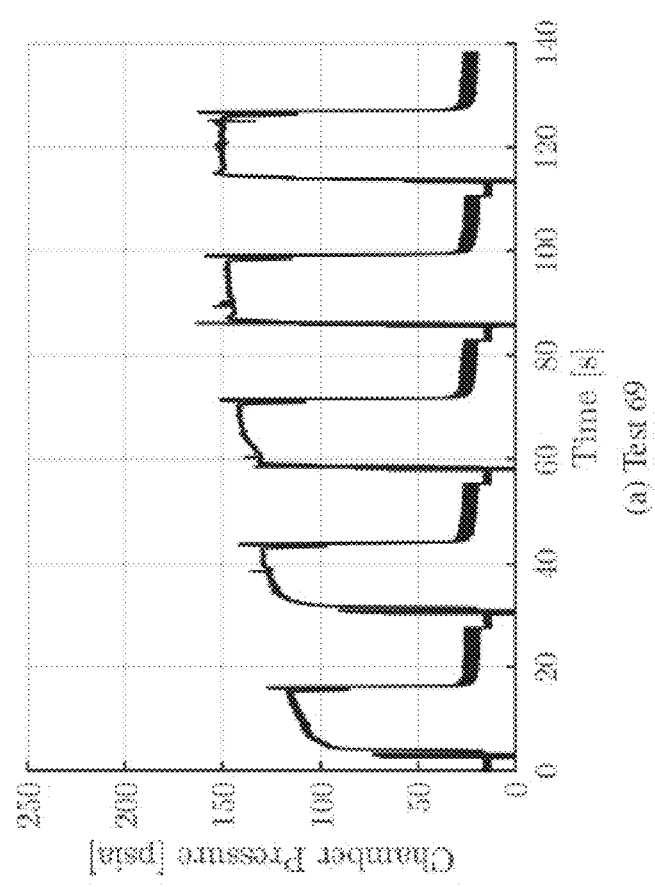

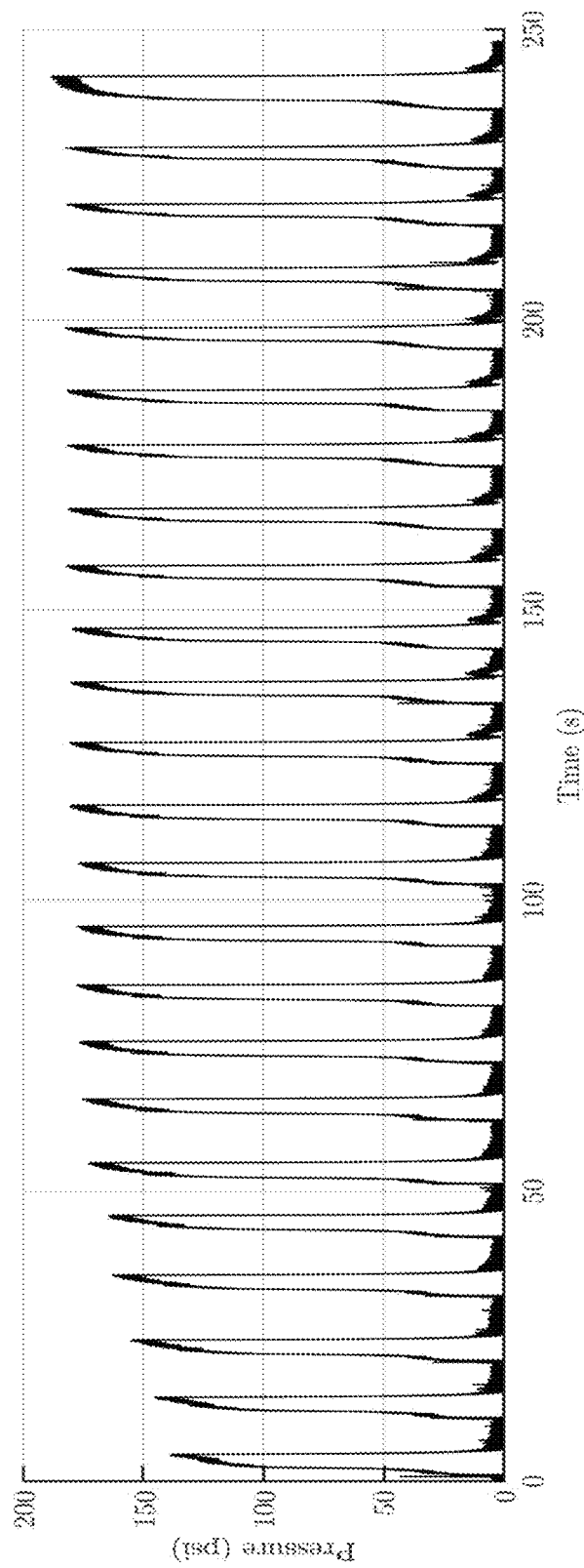
Fig. #9 Combined pressure traces from the 24 vacuum ignitions (Test 76)

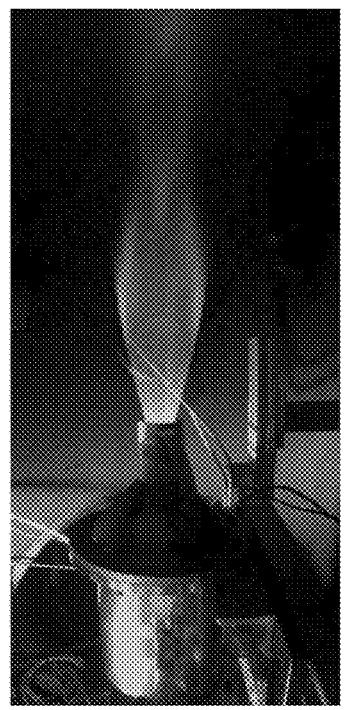
Fig. #10b
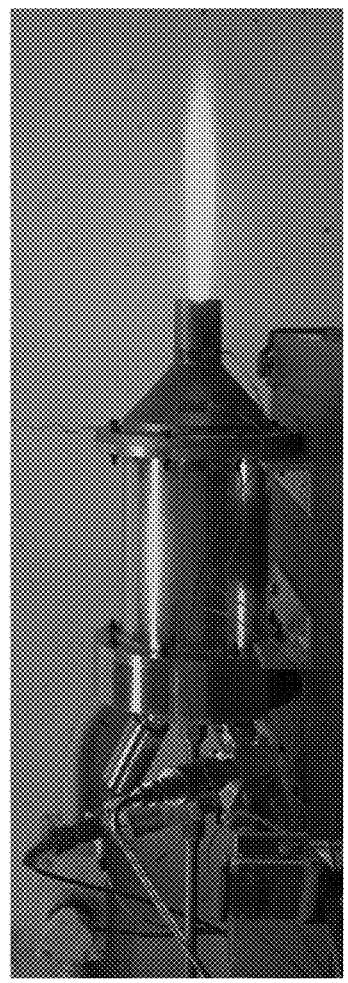
Fig. #10a

Fig. #11
Demonstration of 97.4% fuel utilization

Fig. #12
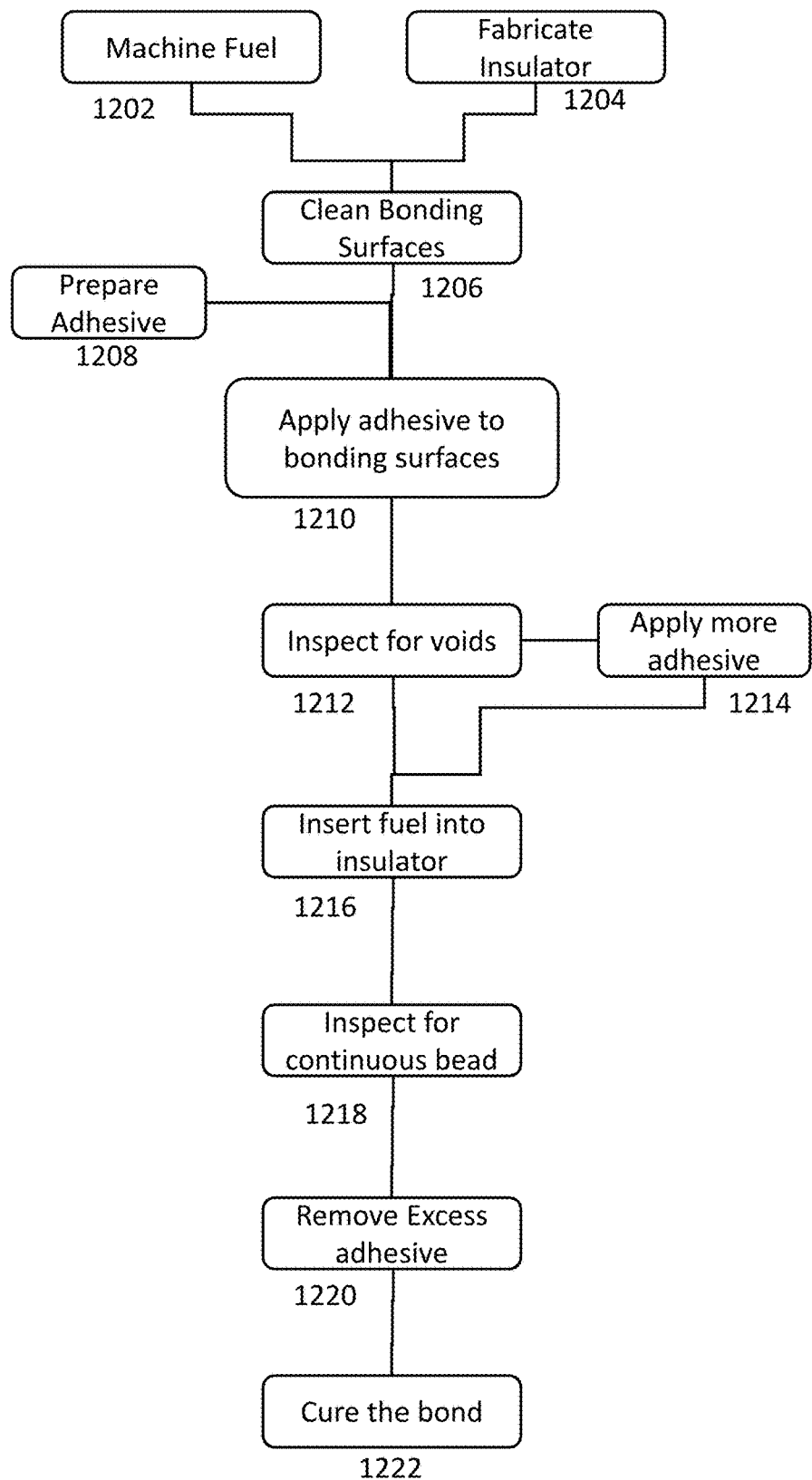

SMALLSAT HYBRID PROPULSION SYSTEM

CROSS-REFERENCED APPLICATIONS

This application claims priority to U.S. Provisional Patent Application No. 62/692,440 filed on Jun. 29, 2018. The enclosure of which is included herein by reference in its entirety

STATEMENT REGARDIING FEDERALLY SPONSORED RESEARCH OR DEVELOPMENT

This invention was made with government support under Grant No. 80NM0018D004 awarded by NASA (JPL). The government has certain rights in the invention.

FIELD OF THE INVENTION

The present invention relates generally to the propulsion system on small satelites and more specifically a propulsion system for CubeSats and SmallSats that allow for orbital insertion and other larger manuevers while providing a non-toxic fuel system.

BACKGROUND OF THE INVENTION

SmallSats is a class of small satellites, typically less than several hundred kilograms which includes CubeSats. CubeSats were originally developed as simple spacecraft primarily for education purposes. They are generally rideshare payloads, meaning they are launched into space on the same launch vehicle as a larger (primary) payload. Typically, SmallSats and CubeSats are classified by size, where a 1 U CubeSat occupies a volumetric form factor of 10×10×10 cm while weighing no more than 1.33 kg (2.9 lb) per unit. The SmallSat can take on any number of volumetric form factors resulting in different classifications of satellites within the SmallSat class. Such form factors can range from CubeSats, typically in the 1 U to 12 U or larger. However, the intent of the CubeSat is to provide a small, relatively inexpensive package for performing space research.

Adoption of CubeSat technology is broadening the participant base. The increased availability of rideshare opportunities and the maturation of small spacecraft are dramatically reducing the cost of entrance to space. Miniaturization of electronics and the development of small-scale components has allowed these small spacecraft to be developed into meaningful tools for science and technology. These small spacecraft have primarily been constrained to LEO (Low Earth Orbit) due to a lack of viable small-scale propulsion systems. Thus interplanetary missions would require small propulsion systems that are capable of providing some type of attitude control as well as performing larger change in velocity ($\Delta V$) maneuvers.

Up until more recently, all CubeSat missions have been restricted to exploration around Earth in line with the LOE constraints previously mentioned. However the first interplanetary CubeSats with propulsion were the twin Mars Cube One (MarCO) telecom relays, which were launched to Mars on 5th May, 2018 with the InSight mission. Thus, the current state of the art for interplanetary SmallSat propulsion is MarCO, which provides about 40 s of $I_{sp}$ for a total Delta V of 68.6 m/s. While successful in its fly-by mission of Mars, the MarCO system does not have sufficient total impulse capability to accomplish orbital insertion and thus has an extremely limited mission life, as is the case with many CubeSat systems in practice today. The goal of many designers is to create a reliable CubeSat system with a propulsion system that is capable of performing the attitude adjustment as well as orbit insertion and orbit/trajectory correction maneuvers.

SUMMARY OF THE INVENTION

Many embodiments are directed to a propulsion system for smaller satellite spacecraft including CubeSats and SmallSats, their design, methods of manufacture, component systems, and materials.

Many embodiments include a CubeSat propulsion system designed to fit in a CubeSat form factor. The propulsion system of many embodiments may include a main propulsion motor vessel centrally disposed within the form factor. The motor accordingly may consist of a body formed from an inner wall and an outer wall that is confined between a forward end and an aft end where the inner wall forms a central cavity. Many embodiments may line the inner wall of the central cavity with an insulative material that forms a thermal protection layer between the inner wall of the central cavity and a solid rocket fuel which may be disposed within the central cavity. In many embodiments the fuel is positioned where the majority of the central cavity is filled with the solid rocket fuel. Additionally, the aft end of the motor vessel further incorporates a flight thrust nozzle that includes a nozzle throat section and a nozzle exit section. In many embodiments, the nozzle throat section is positioned near the aft end of the body and the nozzle exit section is disposed distal to the aft end. Many embodiments may also include multiple oxidizer containment vessels disposed within the form factor and dispersed around the propulsion vessel. Each of the oxidizer vessels may be connected to the propulsion vessel, such that the oxidizer vessels deliver an oxidizer into the propulsion vessel within a predefined channel disposed within the fuel. Finally, many embodiments include an ignition source mechanically connected to the propulsion vessel. The ignition source operates to vaporize a portion of the fuel such that the oxidizer delivered to the propulsion vessel interacts with the vaporized fuel to produce a burn of the fuel along the length of the predefined channel and produce an exhaust thrust through the nozzle.

In other embodiments, the fuel is a Poly Methyl Methacrylate (PMMA).

In still other embodiments, the fuel is a clear PMMA.

In still other embodiments, the fuel is a black PMMA.

In still other embodiments, the fuel is augmented by black ABS

In yet other embodiments, the propulsion system has one to four oxidizer tanks.

In still yet other embodiments, the oxidizer vessels are a composite overwrap pressure vessel (COPV) having a lightweight metallic liner with a composite overwrap.

In other embodiments, the metallic liner is selected from a group consisting of MONEL™ (a majority by weight nickle and copper alloy) and INCONEL™ (a majority by weight nickle chromium alloy).

In still other embodiments, the composite overwrap is made from a material selected from a group consisting of carbon and KEVLAR™ (Poly-paraphenylene terephthalamide.

In yet other embodiments, the CubeSat is a 6 U configuration.

In still other embodiments, the CubeSat is a 12 U configuration.

In still other embodiments, the SmallSat conforms to an ESPA ring configuration.

In still other embodiments, the insulator material is selected from a group consisting of rubber type material, silica phenolic, paper phenolic and carbon phenolic.

In yet other embodiments, the propulsion system has a plurality of cold gas thrusters in fluid communication with the oxidizer tanks such that they are capable of producing thrust for attitude control.

In still yet other embodiments, the cold gas thrusters are selected from a group consisting of Thrust Vector Control thrusters and Attitude Control Systems.

In other embodiments, the ignition source is selected from a group consisting of pyrotechnic ignitor, augmented spark ignitor and laser igniter.

In still other embodiments, the fuel grain further comprises a centralized perforation that runs from the first end of the motor to the second end of the motor.

In yet other embodiments, the channel is a single centralized channel or may be a configuration of multiple channels.

Many embodiments may also include a SmallSat propulsion system, designed to fit in a SmallSat form factor. The propulsion system of many embodiments may include a main propulsion motor vessel centrally disposed within the form factor. The motor accordingly may consist of a body, formed from an inner wall and an outer wall, that is confined between a forward end and an aft end, where the inner wall forms a central cavity. Many embodiments may line the inner wall of the central cavity with an insulative material that forms a thermal protection layer between the inner wall of the central cavity and a solid rocket fuel which may be disposed within the central cavity. In many embodiments, the fuel is positioned where the majority of the central cavity is filled with the solid fuel. Additionally, the aft end of the motor vessel further incorporates a flight thrust nozzle that includes a nozzle throat section and a nozzle exit section. In many embodiments, the nozzle throat section is positioned near the aft end of the body and the nozzle exit section is disposed distal to the aft end. Many embodiments may also include multiple oxidizer containment vessels disposed within the form factor and dispersed around the propulsion vessel. Each of the oxidizer vessels may be connected to the propulsion vessel, such that the oxidizer vessels deliver an oxidizer into the propulsion vessel within a predefined channel disposed within the fuel. Finally, many embodiments include an ignition source mechanically connected to the propulsion vessel. The ignition source operates to vaporize a portion of the fuel such that the oxidizer delivered to the propulsion vessel interacts with the vaporized fuel to produce combustion along the length of the predefined channel and produce an exhaust thrust through the nozzle.

In other embodiments, the fuel is a Poly Methyl Methacrylate (PMMA).

In still other embodiments, the fuel is a clear PMMA.

In yet other embodiments, the propulsion system has two oxidizer vessels.

In still yet other embodiments, the oxidizer vessels are a composite overwrap vessel having a lightweight metallic liner with a composite overwrap.

In other embodiments, the metallic liner is selected from a group consisting of, metal, and Inconel™ (a majority by weight nickle chromium alloy).

In still other embodiments, the composite overwrap is made from a material selected from a group consisting of carbon and KEVLAR™ (Poly-paraphenylene terephthalamide).

In other embodiments, the propellant is a black PMMA.

In still other embodiments, the insulator material is selected from a group consisting of rubber type material and carbon phenolic.

In yet other embodiments, the propulsion system has a plurality of cold gas thrusters in fluid communication with the oxidizer tanks such that they are capable of producing thrust for attitude control.

In still yet other embodiments, the cold gas thrusters are selected from a group consisting of Thrust Vector Control thrusters and Attitude Control Systems.

In other embodiments, the ignition source is selected from a group consisting of pyrotechnic ignitor and augmented spark ignitor.

In still other embodiments, the fuel further comprises a centralized burn channel the runs from the forward end of the motor to the aft end of the motor.

In yet other embodiments, the channel is a single centralized channel or may be a configuration of multiple channels.

DESCRIPTION OF THE DRAWINGS

The description will be more fully understood with reference to the following figures, which are presented as exemplary embodiments of the invention and should not be construed as a complete recitation of the scope of the invention, wherein:

FIG. 1 illustrates classifications of CubeSats in accordance with the current state of the art.

FIG. 2 illustrates a CubeSat configuration in accordance with embodiments of the invention.

FIG. 3 illustrates a motor for use in a SmallSat in accordance with embodiments of the invention.

FIG. 4 schematically illustrates the various components of a SmallSat Propulsion system in accordance with embodiments of the invention.

FIG. 5 illustrates potential design parameters for various hybrid fuels in accordance with embodiments of the invention.

FIG. 6 illustrates a comparison to embodiments of the invention and the current state of the art.

FIG. 7 is a graphical illustration of the repeatability of chamber pressure versus time in accordance with embodiments of the invention.

FIGS. 8a and 8b are graphical illustrations of chamber pressure over time, representing multiple demonstrated ignitions in accordance with embodiments of the invention.

FIG. 9 is a graphical illustration of multiple ignitions under vacuum conditions in accordance with embodiments of the invention.

FIGS. 10a and 10b illustrate a motor firing in both ambient and vacuum conditions in accordance with embodiments of the invention.

FIG. 11 illustrates a high fuel utilization in accordance with embodiments of the invention.

FIG. 12 illustrates a process of bonding the fuel to the insulator in accordance with embodiments of the invention.

DETAILED DESCRIPTION OF THE INVENTION

Turning now to the drawings, a hybrid propulsion system for SmallSats is provided. In accordance with many embodiments, the propulsion system is designed to fit within the form factor of a 12 U spacecraft or a SmallSat class satellite. Additionally, many embodiments are able to generate the necessary thrust for orbital insertion and/or correction.

Many embodiments may also include the use of part or all of the propulsion system to adjust the attitude of the SmallSat in accordance with mission requirements. Many embodiments contain a main motor with a solid fuel that is connected to an oxidizer, usually stored in an oxidizer tank, where the oxidizer is transmitted to the motor and subsequently ignited, generating the combustion necessary to provide adequate thrust for orbital insertion. In many embodiments the propellant combination (fuel and oxidizer) is a non-toxic and stable material combination that can be stored at a variety of temperatures.

Stand-alone interplanetary CubeSat and SmallSat scientific mission concepts require small propulsion systems capable of providing attitude control and completing relatively large $\Delta V$ maneuvers, such as to achieve orbital insertion, corrections and maintenance as well as to complete trajectory correction maneuvers. It also enables the SmallSat to compensate for desaturation of the reaction wheels, etc. An attitude control system is necessary for the satellite if a specific orientation is required. While some SmallSats can function normally without any directionality, others may require a specific orientation, such as pointing to a star or planet. Traditionally, attitude control is done by using one or more control features including, reaction wheels, thrusters, magnetorquers, GPS receivers and antennas, etc.

Reaction wheels, sometimes referred to as momentum wheels are rotational elements within the CubeSat where a fly wheel, connected to a motor, spins at a constant or near constant rotational speed causing the CubeSat to counter-rotate through the conservation of angular momentum. Essentially, they operate to spin the CubeSat about its center of mass in order to orient the satellite in a desired direction. In some instances, reaction wheels are combined with other attitude control devices because the reaction wheel can build up enough momentum to exceed the maximum speed of the wheel, resulting in saturation and the need for correction. Accordingly, some such devices often include thrusters that may be connected to some type of propulsion system.

Several small propulsion systems have been proposed for SmallSats in the past; however, most remain at low performance or low Technology Readiness Level (TRL). Low performance generally refers to the measure of how efficiently the rocket uses the propellant and is often referred to as Specific Impulse ($I_{sp}$) and measured in units of time. Systems that often are considered to be lower performance typically have a Specific Impulse in the range of 40-250 s. Some of the lower performing systems include: cold gas thrusters (40-70 s, TRL 9), controllable solids (200 s, TRL 4-5), and liquid monopropellants (200-250 s, TRL 4-9). Some satellites have used warm gas and cold-gas propulsion systems on earth orbiting SmallSats. However, the vacuum specific impulse of these systems is only around 40-100 s, with thrust around 50 mN; making them ill-suited to missions requiring an orbit insertion burn.

Small advanced monopropellant thrusters using the Ammonium Dinitramide based (ADN-based) LMP-103S and Hydroxyl ammonium Nitrate (HAN-based) AF-M315 have been considered for SmallSat applications. However, they cannot compete with the performance of hybrid systems. The hybrid rocket is an alternative to conventional bi-propellant rockets that embodies certain advantages such as improved safety, potential for reduced cost, and wide controllability.

A hybrid propulsion system, in accordance with many embodiments, is uniquely qualified to achieve the required change in velocity ($\Delta V$) for orbital insertion and correction because of its high performance ($I_{sp}$ greater than 280 s) and dense fuel. In addition, it is capable of multiple ignitions, allowing it to complete all orbit insertion, trajectory correction and orbit change as well as attitude control functions such as thrust vector control, attitude control, momentum wheel desaturation maneuvers. This is of particular importance for science missions that typically require multiple orbit corrections, particularly during fly-bys of moons or other planetary structures. Propellant selection is an important factor that defines a propulsion system's criticality to hazards such as leakage, explosive yield, fire, and pressure, thereby ensuring the launch vehicle will not be adversely affected by the SmallSat. Propellant options are available for hybrid rocket motors that are relatively insensitive to the space environment and comparatively safe. Most hybrid fuels are inert and the separation in phase between the fuel and oxidizer makes hybrid rocket motors safer than alternative chemical propulsion systems.

There is currently no off-the-shelf propulsion system capable of delivering the impulse required for orbital insertion around another planet while fitting within the CubeSat form factor. It is assumed that standalone interplanetary CubeSats and SmallSats will be jettisoned shortly after receiving the required C3 (exit velocity from Earth) to travel to the destination planet. Since these small spacecraft will be launched as a secondary payload on a high priority mission, any hazard introduced by the smaller spacecraft's propulsion system must be mitigated. Hybrid motors are well suited to this application as they have high performance and are inherently safe, due to the physical distance and phase separation of the fuel and oxidizer. Accordingly, many embodiments may utilize a hybrid propulsion system that is compliant with range safety standards, thereby ensuring the overall safety of the primary payload and launch vehicle.

Referring now to the figures, SmallSats generally fit into a volumetric form factor that can range in size depending on the use of the SmallSat. For example. FIG. 1 illustrates various classifications of SmallSats ranging from 1 U to 12 U. Each classification is defined by the volume for which the satellite occupies and may take on any configuration that fits within the volumetric classification. As can be illustrated in FIG. 1, the SmallSat can be easily scaled from a 1 U to a 12 U and beyond such that the volumetric form factor of the satellite fits the desired classification. Thus, many embodiments may be scaled to fit in the desired volumetric form factor of the desired use of the SmallSat. Tasks for SmallSats are becoming increasingly more complex. Therefore, there is a growing need to incorporate some type of propulsion system to perform the attitude adjustments as well as orbit insertion and/or correction. Moreover, SmallSats requiring propulsion systems would require such systems to be stable, safe, and efficient, and capable of fitting within the form factor of the satellite, whether it be a 6 U, 12 U, or even larger.

Embodiments of the Propulsion System

In accordance with many embodiments, a 12 U CubeSat with a self-contained propulsion system is provided in FIG. 2. In many embodiments, a propulsion system that utilizes a hybrid rocket motor may be capable of producing a $\Delta V$ to a spacecraft with 25 kg wet mass that exceeds 500 m/s with attitude control during main motor operation and for reaction wheel unloading. Accordingly, such embodiments may be accommodated within the volumetric form factor of a 12 U envelope as illustrated by the embodiment in FIG. 2. While an embodiment of a 12 U classification may be illustrated in FIG. 2 it should be understood that many embodiments may be incorporated into smaller or larger volumetric form factors such as a 6 U classification. For example, a SmallSat Class propulsion system may be accommodated within an Evolved Expendable Launch Vehicle Secondary Payload Adapter (ESPA) having dimensions of approximately 1.000 m×1.150 m×1.250 m, or similar system. Such embodiments of a larger payload can allow for the hybrid propulsion system to reduce the number of oxidizer tanks as well as reduce the storage pressure of said tanks. For example, some embodiments may only incorporate two oxidizer tanks each having a storage pressure of 31.0 MPa (4500 psia). Many such embodiments of a SmallSat design may be capable of producing the same ΔV in excess of 500 m/s while increasing the overall mass of the spacecraft to 100 kg and ultimately increasing the available volume for non-propulsion components. Many embodiments may be configured to fit in any number of volumes and range in wet mass from 10-200 kg. Likewise, the greater the mass of the embodiment of the satellite, the smaller the ΔV may be achieved and the smaller the mass the larger the ΔV of the satellite.

In many embodiments the SmallSat 200 may consist of various components that are configured to fit within the desired volume of the satellite. For example, many embodiments may incorporate a propulsion system (206, 202, 208, and 210) that may occupy a certain percentage of the total volume of the satellite. In some embodiments the propulsion system (206, 202, 208, and 210) may occupy 76% of the total volume. In many embodiments, the remaining non-propulsion volume 204 may be occupied by any number of elements, such as controls, that may be used for the mission of the SmallSat 200. In many embodiments, the propulsion system consists of a single main hybrid rocket motor 206 surrounded by gaseous or liquid oxidizer tanks 202. The main rocket motor 206 and oxidizer tanks 202 may be configured as cylindrical pressure vessels. In many embodiments, the main rocket motor 306 may contain a solid propellant and may be mechanically connected to the oxidizer tanks 202 by way of some type of feed line or feedline network 208. Additionally, in order to perform required burn of the propellant to generate thrust, an ignition source 210 may be integrated with the main rocket motor 206. Such embodiments of a hybrid propulsion system for a SmallSat offer various advantages over previous designs. Many such advantages include enabling the SmallSat to perform high thrust while maintaining the controllability of the spacecraft. Such embodiments can provide micro propulsion systems 212 to complement other attitude control systems such as reaction wheels. Although a 12 U configuration is illustrated, it should be understood that any number of CubeSat configurations could be used including 1 U, 6 U, 4 U, etc. based on the mission requirements.

Referring now to FIG. 3, a cross sectional view of an embodiment of the main hybrid rocket motor 300 is provided. The main rocket motor 300, in many embodiments, can often consist of various elements such as a pressure vessel 302, fuel 304, and an exhaust nozzle 306. All components of the main rocket motor 300 must be carefully designed to provide the required propulsion for orbital insertion as well as attitude controllability all while preserving the integrity of the pressure vessel and surrounding components of the SmallSat. The pressure vessel 302, in accordance with many embodiments may be lined with an insulator material 308. Such insulators serve as key elements in preserving the integrity of the pressure vessel during the burn operation since it is crucial that the hull integrity of the motor vessel is maintained and not adversely affected by the burning of the propellant. The insulator can help prevent burn through of the pressure vessel that may result in catastrophic damage to the space craft. Traditional insulator materials can include EPDM rubbers and a variety of combinations of other insulator materials. In accordance with many embodiments the insulator material may be a carbon phenolic material as it has a slow ablation rate and a greater tendency to char rather than melt. It should be understood that any number of insulator materials may be used to line the pressure vessel of the motor.

Pressure vessels can be manufactured in any number ways including a metallic cylindrical container. The metallic pressure vessel may be manufactured in any number of ways and with any number of materials. Likewise, space applications may often require lighter materials so as not to add unnecessary weight to the system. Accordingly, many embodiments may incorporate a composite pressure vessel. Composite materials are often selected for space based applications due to high strength and light weight of the material. In some embodiments the composite material may be a carbon fiber material. In other embodiments, the composite material may be made from a KEVLAR™ (Poly-paraphenylene terephthalamide) material. In yet other embodiments, the composite material may be both carbon fiber and KEVLAR™ (Poly-paraphenylene terephthalamide). It should be understood that any number of materials may be used for manufacture of the pressure vessel such that the material selected is suitable for space based applications.

In reference to the pressure vessel of the motor, it should also be understood that many embodiments of the oxidizer tanks 212 (referring back to FIG. 2) may be manufactured in any number of ways similar to that of the pressure vessel of the motor 206. For example, some embodiments may incorporate a metallic oxidizer tank such as steel or INCONEL™ (a majority by weight nickel chromium alloy). Even still, other embodiments may incorporate the use of lighter materials such as any number of composite materials. Additionally, many embodiments may incorporate the combination of metal and composite in a composite overwrap pressure vessel (COPV). Such embodiments may be capable of producing a pressure vessel of withstanding the necessary pressures of the oxidizer tanks by wrapping a base metallic pressure vessel with a composite material. In some embodiments, the composite material for either pure composite or COPV may be from any number of suitable materials that may include carbon fiber and KEVLAR™ (Poly-paraphenylene terephthalamide).

In accordance with many embodiments the fuel 304 may be formed within the cavity of the pressure vessel 302 such that it contains an open channel 310 whereby the oxidizer can flow during the burn of the propellant (fuel and oxidizer). In accordance with some embodiments the open channel 310 may be a center perforation centrally located in the fuel 304. In other embodiments, the open channel may be one or more channels formed into the fuel 304 that are capable of producing different burn characteristics that may produce different burn ratios as well as burn times. Accordingly, in many embodiments, the oxidizer is designed to be fed from the oxidizer tanks (not shown) into the main rocket motor 300 by way of an oxidizer inlet 312. Likewise, many embodiments may connect an ignition source, such as an ignitor, to the pressure vessel 302 by way of an ignition port 314. In many embodiments, the ignition source may be used to vaporize the fuel thereby leading to the burn of the propellant. Essentially, the ignition of the fuel 304 acts to vaporize a portion of the fuel 304 and heat the oxidizer as it flows into the motor along the center perforation 310 which in turn leads to the combustion of the fuel thereby generating the thrust out the nozzle. In many embodiments, the fuel grain is formed with a central port 310 for which the oxidizer can move along the fuel grain and combust. The combustion and subsequent pressure contained by the pressure vessel is forced out through the nozzle 306 whereby the necessary thrust is created. In accordance with many embodiments, the nozzle configuration can be modified in coordination with the propellant to generate the thrust and subsequent ΔV necessary for orbital insertion and/or correction. A key feature that hybrid propulsion systems can capitalize on is the ability to start and stop the combustion process multiple times thereby not utilizing the entire propellant 402 in a single burn. Such functionality can improve the ability of the SmallSat to complete multiple maneuvers.

Referring now to FIG. 4, many embodiments contain a number of feedline components necessary to operate a hybrid propulsion system 400. Accordingly, FIG. 4 illustrates a feed line schematic of a hybrid propulsion system, according to embodiments of the invention. A portion of the system may contain one or more oxidizer tanks 402. The oxidizer tanks can serve a dual purpose in a SmallSat configuration. As illustrated in FIG. 4, some embodiments of a hybrid propulsion system 400 may incorporate one or more cold gas thrusters 408. The cold gas thrusters 408, according to some embodiments can function as Thrust Vector Control (TVC) thrusters or Attitude Control System (ACS) thrusters. Such cold gas thruster function by forcing the inert gas through a propulsion nozzle thereby creating the necessary thrust for attitude adjustment or thrust vector control. The oxidizer tanks may be connected to the cold gas thrusters by way of an oxidizer feed line 410 with various components such as control valves 412, regulators 414, and filters 415. Additional elements such as fill valves 418 may be used to load the oxidizer into the storage tank(s) 402. Many embodiments may use instrumentation, such as pressure transducers 416, to monitor the system. As previously discussed, many embodiments of the propulsion system contain an ignition source 401 that is pointed into main rocket motor 406 and functions to ignite the fuel within the motor (shown in FIG. 3).

The ignition source 401, in accordance with some embodiments, may be an augmented spark ignitor having a fuel source 420 connected to a fuel feed line 422. An augmented spark ignitor, in accordance with many embodiments may be utilized for producing multiple burns of the propellant. Augmented spark igniters, in accordance with many embodiments, operate in a similar fashion as a rocket motor having a control valve that can control a distribution of fuel to the ignitor and can be used a number of times over the life of the fuel. In many embodiments, the augmented spark igniter may utilize an oxygen /methane fuel combination for the ignitor. In some embodiments, the fuel feed line for the augmented spark igniter may also have control valves like the oxidizer feed line designed to regulate the flow of fuel to the ignition source 401. While an augmented spark ignitor is illustrated in FIG. 4, many embodiments may require the use of a simpler ignition source. Accordingly, many embodiments may use a simple pyrotechnic ignitor that has a low mass and is highly reliable. Such ignitors may only allow for a single ignition and may only be good for missions that require a single, long burn. Some embodiments may also use a laser igniter.

Although certain elements of embodiments are described to fit within the constraints of a SmallSat, many embodiments may incorporate the same or similar elements of the hybrid propulsion system into larger or smaller vehicle configurations. For example, the elements presented in FIGS. 3 and 4, in accordance with some embodiments may be scaled up to fit within a SmallSat design configuration or likewise scaled down to fit in a smaller CubeSat design.

Embodiments of the Propellant Combination

As previously described, the propellant combination is an essential component in many embodiments to ensure the proper thrust is generated within a CubeSat or SmallSat design. Additionally, the stability and functionality of the propellant is crucial in the overall deployment of the primary launch vehicle. Some key features of the desired propellant should be: stability over time, reliability and repeatability with motor firings and burns, combustion efficiency, a higher rate of fuel utilization, and the ability to support long duration burns.

In accordance with many embodiments, the propellant may be a hybrid propellant that uses two components, a fuel grain and an oxidizer. As previously discussed, the hybrid propellant functions by the initial vaporization of the fuel grain by way of an ignition source. The oxidizer may subsequently be introduced into the vaporized fuel resulting in combustion. In accordance with many embodiments, the fuel grain may be a Poly (Methyl Methacrylate) (PMMA) fuel grain as illustrated by the table in FIG. 5. Although many embodiments may use a clear PMMA grain, some embodiments may utilize a darker or black PMMA fuel grain. Additionally, many embodiments may augment the PMMA grain with an Acrylonitrile Butadiene Styrene (ABS) material. Some embodiments may augment the PMMA grain with a black ABS material.

In many embodiments, the oxidizer may be a Gaseous Oxygen (GOx). Such embodiments function to produce a propellant system that may be considered green as it is non-toxic. Furthermore, such propellant components have been demonstrated to show relatively stable and repeatable combustion (FIG. 7) and capable of being stored at a wide range of temperatures. For example, the table in FIG. 6 illustrates the desired advantages of using a hybrid propulsion system over other non-hybrid propellant systems. Previous uses of hybrid propulsion systems have not been successful at meeting many of the desired characteristics necessary for a space based propulsion system nor have they demonstrated the ability to be successful in multiple ignitions under vacuum with stable combustion over a wide range of chamber pressures, oxidizer to fuel ratios, oxidizer mass fluxes, and motor scales. As such, many embodiments of a propulsion system illustrate great improvements over previous systems and are capable of meeting the desired characteristics of space based propulsion.

A hybrid rocket motor can be widely referred to as stable if the chamber pressure oscillations are less than 5% of the mean chamber pressure. A hybrid propulsion system, in accordance with many embodiments, has a demonstrable ability to remain stable over time, as illustrated by the graph in FIG. 7. Specifically, FIG. 7 illustrates the ability of an embodiment of a hybrid propulsion system to maintain chamber pressure oscillations with the 5% criterion for each test as well as over the average of the tests presented.

As many embodiments of the propulsion system may incorporate multiple burn cycles or multiple ignitions, reliability in the ignition system as well as repeatability in the overall system is important. This is especially true for the ignition that occurs in space or within a vacuum. FIGS. 8*a* and 8*b*, for example, illustrate multiple tests over which embodiments of a propulsion system underwent multiple ignitions to evaluate the ability to achieve similar chamber pressures for each ignition. It can be illustrated that many embodiments are capable of performing multiple reliable and repeatable ignitions, with each firing achieving a similar result in terms of chamber pressure. For example, FIG. 9 shows multiple ignitions under vacuum conditions, less than 30 mTorr, capable of producing reliable pressures for each subsequent ignition. Such characteristics are illustrative of many embodiments. FIGS. 10a and 10b illustrate different burns of embodiments of a motor in different conditions. For example, FIG. 10a illustrates a burn under ambient conditions while FIG. 10b illustrates a burn under vacuum conditions. Thus, further demonstrating the reliability of many embodiments to produce multiple reliable ignitions under vacuu.

Fuel utilization is also a key element in a rocket motor performance criterion. Fuel utilization refers to the unburned sliver fraction of fuel. In accordance with many embodiments, the desired fuel utilization rate should be close to 97%. In many embodiments, the oxidizer flow rate may be adjusted (increased or decreased) in order to achieve the overall fuel utilization rate of 97% or higher. FIG. 11 illustrates a cross sectional view of a burned motor that meets the 97% fuel utilization rate.

In accordance with many embodiments, the desired fuel utilization rate may also be a function of the bonding of the fuel to the insulator. As such, FIG. 12 illustrates an embodiment of a bonding process for the fuel and the insulator. In accordance with many embodiments, the fuel and the corresponding insulator may be fabricated at different times by any number of suitable methods (1202, 1204). In accordance with some embodiments, the fuel grain may be machined 1202 on the outer diameter such that there is a 0.007-0.010 inch clearance between the fuel grain and the insulator material. Once the insulator has been fabricated 1204 and the corresponding embodiment of fuel has been machined 1202, many embodiments may incorporate the cleaning of all bonding surfaces 1206 prior to bonding. In many embodiments, such cleaning may be done with dry nitrogen. Additionally, an adhesive material may prepared 1208 to bond the fuel grain and the insulator. Once prepared, the adhesive may be applied 1210 to both the outer diameter of the fuel as well as the inner diameter of the insulator material. As the bonding process is important to achieving the high fuel utilization rate, many embodiments should ensure the adhesive on both the fuel and the insulator contains no voids. Many embodiments may incorporate a variety of inspection steps 1212 to inspect the adhesive has no voids. Likewise, if any voids were to be discovered, some embodiments may apply additional adhesive 1214 to one or both the insulator or fuel bonding surfaces. Once both the insulator and the fuel have been fully coated with adhesive they may be bonded together by the insertion of the fuel into the insulator 1216 and subsequently cured. Once inserted, many embodiments of bonding may incorporate a step to ensure that a continuous bead of adhesive is seen between the fuel and the insulator 1218. Subsequently, the excess adhesive may be removed 1220 and the combination may be allowed to cure at ambient conditions 1222.

SUMMARY & DOCTRINE OF EQUIVALENTS

As can be inferred from the above discussion, the above-mentioned concepts can be implemented in a variety of arrangements in accordance with embodiments of the invention. Specifically, the hybrid propulsion system may be implemented in a number of configurations including Small-Sats including CubeSats such as a 6 U or 12 U configuration. Achieving such functionality, according to embodiments, involves the implementation of special arrangements/designs between subsystems described above, and their equivalents.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A CubeSat propulsion system comprising:
   a CubeSat form factor having a defined single volume;
   a main propulsion motor vessel centrally disposed within the defined single volume and having a body with a forward end and an aft end and being formed of an outer wall and an inner wall, wherein the inner wall forms a central cavity, and wherein the inner wall is lined with an insulative material that forms a thermal protection layer between the inner wall and a solid rocket fuel, the solid rocket fuel being disposed within the central cavity and bonded to the insulative material such that the solid rocket fuel is positioned where a majority of the central cavity is filled with the solid rocket fuel,
   wherein the aft end further comprises a flight thrust nozzle having a nozzle throat section and a nozzle exit section wherein the nozzle throat section is positioned near the aft end and the nozzle exit section is disposed distal to the aft end,
   multiple oxidizer containment vessels disposed within the defined single volume and dispersed around the main propulsion motor vessel and wherein each oxidizer vessel of the multiple oxidizer vessels is fluidly connected to the main propulsion motor vessel, such that each oxidizer vessel of the multiple oxidizer vessels delivers an oxidizer upstream of the solid rocket fuel, and into the main propulsion motor vessel within a predefined channel disposed within the solid rocket fuel, and
   an ignition source mechanically connected to the main propulsion motor vessel wherein the ignition source operates to vaporize a portion of the solid rocket fuel to generate a vaporized fuel and wherein the oxidizer delivered to the main propulsion motor vessel interacts with the vaporized fuel to produce combustion along the length of the predefined channel and produce an exhaust thrust through the flight thrust nozzle such that a solid rocket fuel utilization rate of 97% or higher is achieved due to the bonding of the solid rocket fuel and the insulative material.

2. The CubeSat propulsion system of claim 1, wherein the solid rocket fuel is a Poly Methyl Methacrylate (PMMA).

3. The CubeSat propulsion system of claim 2, wherein the solid rocket fuel is a clear PMMA.

4. The CubeSat propulsion system of claim 1, wherein the multiple oxidizer containment vessels comprises four oxidizer vessels.

5. The CubeSat propulsion system of claim 1, wherein each oxidizer containment vessel of the multiple oxidizer containment vessels comprises a respective composite overwrap vessel having a respective lightweight metallic liner with a respective composite overwrap.

6. The CubeSat propulsion system of claim 5, wherein each metallic liner is selected from a group consisting of:

steel, an alloy comprising a majority by weight of nickel and copper, and an alloy comprising a majority by weight of nickel and chromium.

7. The CubeSat propulsion system of claim 5, wherein the composite overwrap is made from a material selected from a group consisting of carbon and Poly-paraphenylene terephthalamide.

8. The CubeSat propulsion system of claim 1 wherein the CubeSat form factor is a 6 U configuration.

9. The CubeSat propulsion system of claim 1 wherein the CubeSat form factor is a 12 U configuration.

10. The CubeSat propulsion system of claim 2, wherein the solid rocket fuel is a black PMMA.

11. The CubeSat propulsion system of claim 1, wherein the insulative material is selected from a group consisting of a rubber type material and carbon phenolic.

12. The CubeSat propulsion system of claim 1, further comprising a plurality of cold gas thrusters in fluid communication with the multiple oxidizer containment vessels such that the plurality of cold gas thrusters are capable of producing thrust for attitude control.

13. The CubeSat propulsion system of claim 12, wherein the cold plurality of gas thrusters are selected from a group consisting of Thrust Vector Control thrusters and Attitude Control thrusters.

14. The CubeSat propulsion system of claim 1, wherein the ignition source is selected from a group consisting of pyrotechnic ignitors, augmented spark ignitors and laser ignitors.

15. The CubeSat propulsion system of claim 1, wherein the solid rocket fuel further comprises a centralized burn channel the runs from the forward end the aft end.

16. The CubeSat propulsion system of claim 15, where the centralized burn channel is a single centralized channel.

17. The CubeSat propulsion system of claim 15, wherein the centralized burn channel is a preformed configuration of multiple channels.

18. A SmallSat propulsion system comprising:
a SmallSat volume having a mass of less than 200 kg;
a main propulsion motor vessel centrally disposed and having a body with a forward end and an aft end and being formed of an outer wall and an inner wall, wherein the inner wall forms a central cavity, and wherein the inner wall is lined with an insulative material that forms a thermal protection layer between the inner wall and a solid rocket fuel, the solid rocket fuel being disposed within the central cavity and bonded to the insulative material such that the solid rocket fuel is positioned where a majority of the central cavity is filled with the solid rocket fuel,
wherein the aft end further comprises a flight thrust nozzle having a nozzle throat section and a nozzle exit section wherein the nozzle throat section is positioned near the aft end and the nozzle exit section is disposed distal to the aft end,
multiple oxidizer containment vessels dispersed around the main propulsion motor vessel and wherein each oxidizer vessel of the multiple oxidizer vessels is fluidly connected to the main propulsion motor vessel, such that each oxidizer vessel of the multiple oxidizer vessels delivers an oxidizer upstream of the solid rocket fuel, and into the main propulsion motor vessel within a predefined channel disposed within the solid rocket fuel, and
an ignition source mechanically connected to the main propulsion motor vessel wherein the ignition source operates to vaporize a portion of the solid rocket fuel to generate a vaporized fuel and wherein the oxidizer delivered to the main propulsion motor interacts with the vaporized fuel to produce combustion along a length of the predefined channel and produce an exhaust thrust through the flight thrust nozzle such that a solid rocket fuel utilization rate of 97% or higher is achieved due to the bonding of the solid rocket fuel and the insulative material.

19. The SmallSat propulsion system of claim 18, wherein the solid rocket fuel is a Poly Methyl Methacrylate (PMMA).

20. The SmallSat propulsion system of claim 19, wherein the solid rocket fuel is a clear PMMA.

21. The SmallSat propulsion system of claim 18, the multiple oxidizer containment vessels comprise two oxidizer vessels.

22. The SmallSat propulsion system of claim 18, wherein the multiple oxidizer containment vessels are a composite overwrap vessel having a lightweight metallic liner with a composite overwrap.

23. The SmallSat propulsion system of claim 22, wherein the metallic liner is selected from a group consisting of: steel, an alloy comprising a majority by weight of nickel and copper, and an alloy comprising a majority by weight of nickel and chromium.

24. The SmallSat propulsion system of claim 22, wherein the composite overwrap is made from a material selected from a group consisting of carbon and Poly-paraphenylene terephthalamide.

25. The SmallSat propulsion system of claim 19, wherein the solid rocket fuel is a black PMMA.

26. The SmallSat propulsion system of claim 18, wherein the insulative material is selected from a group consisting of a rubber type material and carbon phenolic.

27. The SmallSat propulsion system of claim 18, further comprising a plurality of cold gas thrusters in fluid communication with the multiple oxidizer containment vessels such that the plurality of cold gas thrusters are capable of producing thrust for attitude control.

28. The SmallSat propulsion system of claim 27, wherein the plurality of cold gas thrusters are selected from a group consisting of Thrust Vector Control thrusters and Attitude Control thrusters.

29. The SmallSat propulsion system of claim 18, wherein the ignition source is selected from a group consisting of ignitors, augmented spark ignitors and laser ignitors.

30. The SmallSat propulsion system of claim 18, wherein the solid rocket fuel further comprises a centralized burn channel tho that runs from the forward end to the aft end.

31. The SmallSat propulsion system of claim 30, where the centralized burn channel is a single centralized channel.

32. The SmallSat propulsion system of claim 30, wherein the centralized burn channel is a preformed configuration of multiple channels.

* * * * *